Feb. 16, 1943.  P. M. FREER  2,311,529
BRAKE
Filed Feb. 17, 1941
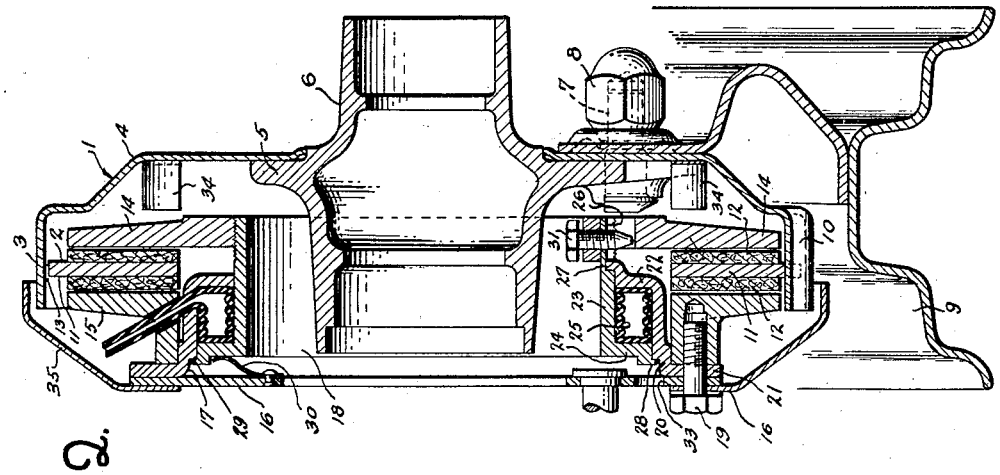
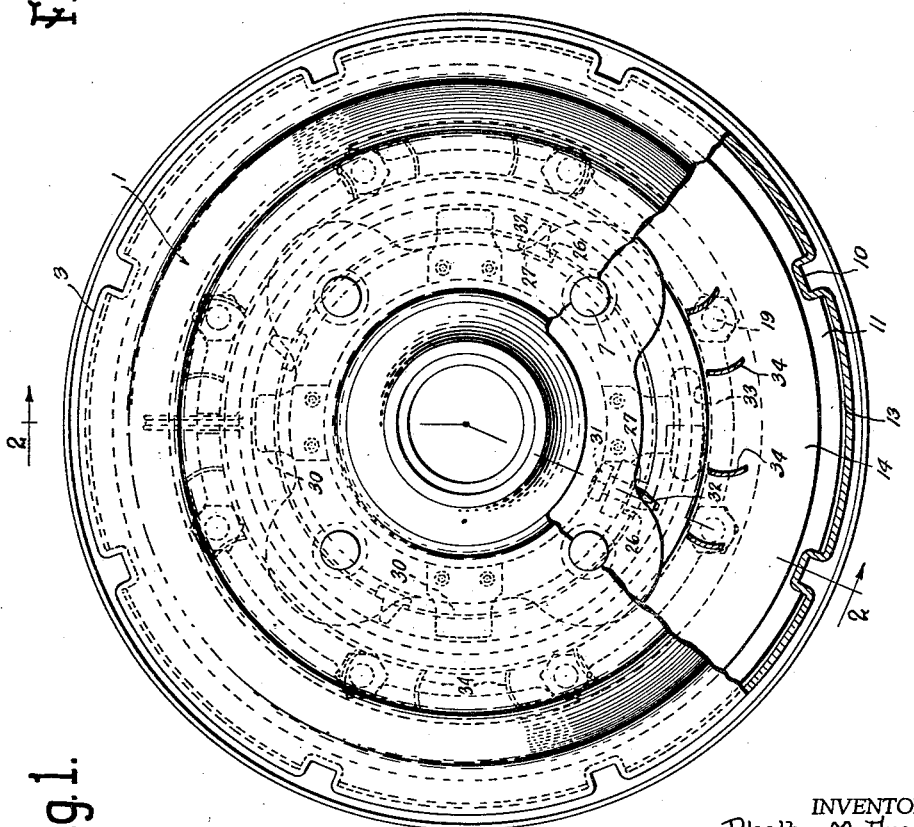
INVENTOR.
Phelps M. Freer
BY Whittemore, Hulbert & Belknap
Attorneys

Patented Feb. 16, 1943

2,311,529

UNITED STATES PATENT OFFICE 2,311,529

BRAKE

Phelps M. Freer, Detroit, Mich.

Application February 17, 1941, Serial No. 379,314

4 Claims. (Cl. 188—72)

The invention relates to brakes and refers more particularly to disc brakes for use in automobiles, airplanes, and the like.

The invention has for one of its objects to provide a brake of relatively few parts arranged to form a simple, strong structure.

The invention has for other objects to provide an improved construction for effecting the cooling of the brake and to provide improved mountings for the friction members of the brake.

With these and other objects in view, the invention resides in the novel features of construction and combinations and arrangements of parts as more fully hereinafter set forth.

In the drawing:

Figure 1 is an elevation, partly broken away, of a brake embodying my invention;

Figure 2 is a cross section on the line 2—2 of Figure 1.

As illustrated in the present instance, the rotatable element of the brake comprises the drum 1 and the friction member 2. The drum is formed of the annular flange 3 and the web 4, which latter is mounted upon the fixed flange 5 of the hub 6. The fixed flange is provided with the bolts 7 which secure the web to the fixed flange and which are threadedly engaged by the nuts 8 for detachably securing the wheel 9 to the fixed flange. The periphery of the fixed flange is indented between the bolts. The annular flange 3 is provided with means for keying the friction member 2 thereto and allowing the friction member to move axially. In detail, the annular flange is formed with the axially extending radially inwardly depressed channel-shaped ribs or keys 10 which are equally spaced about the periphery of the annular flange. The friction member 2 is formed of the flat annular disc 11 which extends radially inwardly from the annular flange 3 and has secured to its opposite faces the linings 12, the radially outer edges of which are spaced from the annular flange. The disc has a sliding fit with the ribs 10 and its periphery between the ribs is radially spaced from the adjacent portions of the annular flange 3 to provide the openings 13 for the axial passage of air.

The non-rotatable element of the brake comprises the friction members 14 and 15 which are respectively engageable with the outboard and inboard sides of the friction member 2. The friction members 14 and 15 form, in effect, discs, the latter, however, being of angular cross section. The two friction members 14 and 15 are non-rotatably mounted on the fixed backing plate 16.

The mounting comprises the collar 17, the sleeve 18 and the bolts 19. The collar has the axial portion 20, the radially outwardly extending flange 21 at its inboard end and the radially inwardly extending flange 22 at its outboard end. The axial flange of the friction member 15 is sleeved on the axial portion 20 of the collar and is threadedly engaged by the bolts 19 which serve to secure the friction member 15 to the backing plate 16 and to also clamp the collar 17 to the backing plate. The sleeve 18 has the axial portion 23 which is slidably engaged by the outboard flange 22 of the collar. The outboard end of the sleeve is externally threaded for engagement by the friction member 14. The sleeve has at its inboard end the radially outwardly extending flange 24 which is slidably engageable with the axial portion 20 of the collar 17. The construction is such that the radial flanges 22 and 24 and the adjacent axial portions of the collar and sleeve cooperate to form an annular closed space or chamber for receiving the actuator for the brake. The actuator is fluid pressure operated and, as shown, comprises the expansible member 25, which is preferably a rubber tube having corrugated radially inner and outer walls.

For holding the sleeve from rotation relative to the collar, the axial portion 23 of the sleeve at its outboard end is provided with the external angularly spaced axially extending slots 26 which are engageable by correspondingly spaced projections 27 formed on the flange 22 of the collar.

For limiting the movement of the sleeve in an outboard direction, the sleeve is formed at its inboard end with the radial flange 28 which is engageable with the annular shoulder 29 formed on the axial portion 20 of the collar. The angularly spaced springs 30 secured to the backing plate 16 and abutting the radial flange 24 of the sleeve normally urge the sleeve in an outboard direction to retain the friction member 14 in inoperative or off position. At this time the friction member 2 has also moved to occupy inoperative position.

The inoperative position of the friction member 14 may be varied by screwing the friction member on or off the sleeve. The locking in adjusted position is secured by the set screw 31 having an end adapted to extend into one of the angularly spaced slots 32 formed in the friction member.

The backing plate 16 is formed in its lower portion with the opening 33 which is located radially inwardly of the radially outwardly extending flange 21 of the collar. The opening forms an oil drain and also an air intake and it will be noted that the radially outwardly extending flange 24 of the sleeve and also the radially outwardly extending flange 21 of the collar cooperate with the backing plate to form a pocket for receiving the oil and directing the same to the opening. 34 are fan blades fixedly secured to the web 4 of the drum and rotatable therewith. The fan blades preferably are formed in pairs with the blades of each pair integral with a base which is fixedly secured to the web as by being welded or riveted thereto. The fan blades during rotation draw air through the opening 33 and axially through the space formed by the sleeve and the hub barrel encircled by the sleeve, then force this air radially outwardly between the web and the adjacent friction member 14 and then axially in an inboard direction. The openings 13 have an air passage capacity less than the air capacity of the fan blades at a predetermined R. P. M. so that all of the air cannot pass through the openings 13, but some of it must pass between the friction faces of the friction members 2, 14 and 15 when the friction members are disengaged before emerging through the annular space formed between the annular flange 3 of the drum and the guard 35 which is secured to the backing plate and extends over the annular flange.

What I claim as my invention is:

1. In a brake, a drum, a backing plate provided with an opening therethrough in its lower portion, a collar secured to said backing plate, a sleeve mounted on said collar, said collar and sleeve cooperating with said backing plate to form a pocket leading to said opening, and cooperable friction members mounted on said drum and sleeve.

2. In a brake, a drum, a backing plate, a friction member within and mounted on said drum, an axially movable friction member engageable with a side of said first mentioned friction member, a third friction member engageable with the other side of said first mentioned friction member, an axially movable sleeve operatively connected to said second mentioned friction member, and a collar fixedly secured to said backing plate and extending axially between and telescopically engaged by said third friction member and sleeve.

3. In a brake, a drum, a backing plate, a friction member within and mounted on said drum, an axially movable friction member engageable with a side of said first mentioned friction member, a third friction member engageable with the other side of said first mentioned friction member, an axially movable sleeve operatively connected to said second mentioned friction member, a collar fixedly secured to said backing plate and located between and engaged by said third friction member and sleeve, said sleeve and collar together forming an annular space, and means within the annular space for axially moving said sleeve.

4. In a brake, a rotatable friction member, a second friction member movable axially into engagement with said first mentioned friction member, a collar held from rotation, an axially movable sleeve extending within and slidably engaging said collar and extending through said first mentioned friction member, cooperating means on said collar and sleeve for holding the latter from rotation relative to the former, and cooperating means on said second friction member and sleeve for axially adjustably mounting the former on the latter.

PHELPS M. FREER.